United States Patent
Qiang

(10) Patent No.: US 7,954,002 B2
(45) Date of Patent: May 31, 2011

(54) SYSTEMS AND METHODS FOR BULK RELEASE OF RESOURCES ASSOCIATED WITH NODE FAILURE

(75) Inventor: Zu Qiang, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 190 days.

(21) Appl. No.: 12/256,853

(22) Filed: Oct. 23, 2008

(65) Prior Publication Data
US 2010/0037085 A1 Feb. 11, 2010

Related U.S. Application Data

(60) Provisional application No. 61/086,851, filed on Aug. 7, 2008.

(51) Int. Cl.
*G06F 11/00* (2006.01)
(52) U.S. Cl. .............................. 714/4; 710/200
(58) Field of Classification Search ...... 714/4; 710/200; 455/26.1
See application file for complete search history.

(56) References Cited

U.S. PATENT DOCUMENTS

| | | | |
|---|---|---|---|
| 5,333,314 A * | 7/1994 | Masai et al. | 714/16 |
| 5,802,582 A | 9/1998 | Ekanadham et al. | |
| 7,386,615 B1 * | 6/2008 | Surlaker et al. | 709/226 |
| 7,426,653 B2 * | 9/2008 | Hu et al. | 714/4 |
| 7,444,335 B1 * | 10/2008 | Colrain et al. | 714/4 |
| 7,496,574 B2 * | 2/2009 | Walker | 710/200 |
| 2004/0139196 A1 * | 7/2004 | Butler et al. | 709/225 |
| 2004/0220933 A1 * | 11/2004 | Walker | 707/8 |
| 2005/0268145 A1 * | 12/2005 | Hufferd et al. | 714/2 |
| 2005/0273645 A1 * | 12/2005 | Satran et al. | 714/4 |
| 2007/0083687 A1 * | 4/2007 | Rinaldi et al. | 710/200 |
| 2008/0209258 A1 * | 8/2008 | Casale et al. | 714/4 |

FOREIGN PATENT DOCUMENTS
WO 2008/079769 A2 7/2008

OTHER PUBLICATIONS

Ericsson: "Pseudo-CR on GTP Error Handling"; 3GPP TSG CT WG4 Meeting #39bis, Zagreb, Croatia, Jun. 23-27, 2008, C4-081559, 7 pages.
Muhanna A. et al.: Binding Revocation for IPv6 Mobility; Switzerland, No. 2, Jul. 11, 2008, XP015059603, section 3, 32 pages.
Ericsson: "Bulk Revocation Support"; 3GPP TSG CT WG4 Meeting #40bis, Phoenix, USA, Oct. 6-10, 2008, C4-082852, 3 pages.
Ericsson: "Partial Node Fault Restoration Procedures for PGW, SGW, and MME"; 3GPP TSG Ct WG4 Meeting #40bis, Phoenix, USA, Oct. 6-10, 2008, C4-082602, 12 pages.

(Continued)

*Primary Examiner* — Marc Duncan
(74) *Attorney, Agent, or Firm* — Alex Nicolaescu; Ericsson Canada Inc.

(57) ABSTRACT

Systems and methods according to these exemplary embodiments provide for methods and systems for improving efficiency in communications systems by, for example, bulk release of resources upon a partial node failure. Bulk release messages including, for example, at least one identifier associated with a plurality of resources, can be transmitted from a node toward other nodes to release such resources after the node failure.

18 Claims, 7 Drawing Sheets

OTHER PUBLICATIONS

Ericsson: "Pseudo-CR on Partial Node Fault in GTPv2-C"; 3GPP TSG CT WG4 Meeting #40, Phoenix, USA, Oct. 6-10, 2008, C4-082603, 25 pages.

International Search Report for PCT/IB2009/053348 dated Jan. 20, 2010; 6 pages.

3GPP2 N.S0005-0, Version 1.0 (3rd. Generation Partnership Project 2 "3GPP2"): "Cellular Radiotelecommunications Intersystem Operations", 1492 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1    602
                                +-+-+-+-+-+-+-+-+-+-+-+-+-+-+-+-+
                                | B.R. Type = 1 |   R. Trigger   |
+-+-+-+-+-+-+-+-+-+-+-+-+-+-+-+-+-+-+-+-+-+-+-+-+-+-+-+-+-+-+-+-+
|          Sequence #           |P|A|G|        Reserved          |
+-+-+-+-+-+-+-+-+-+-+-+-+-+-+-+-+-+-+-+-+-+-+-+-+-+-+-+-+-+-+-+-+
|                                                                |
.                                                                .
.                         Mobility options                       .
.                                                                .
|                                                                |
+-+-+-+-+-+-+-+-+-+-+-+-+-+-+-+-+-+-+-+-+-+-+-+-+-+-+-+-+-+-+-+-+
```

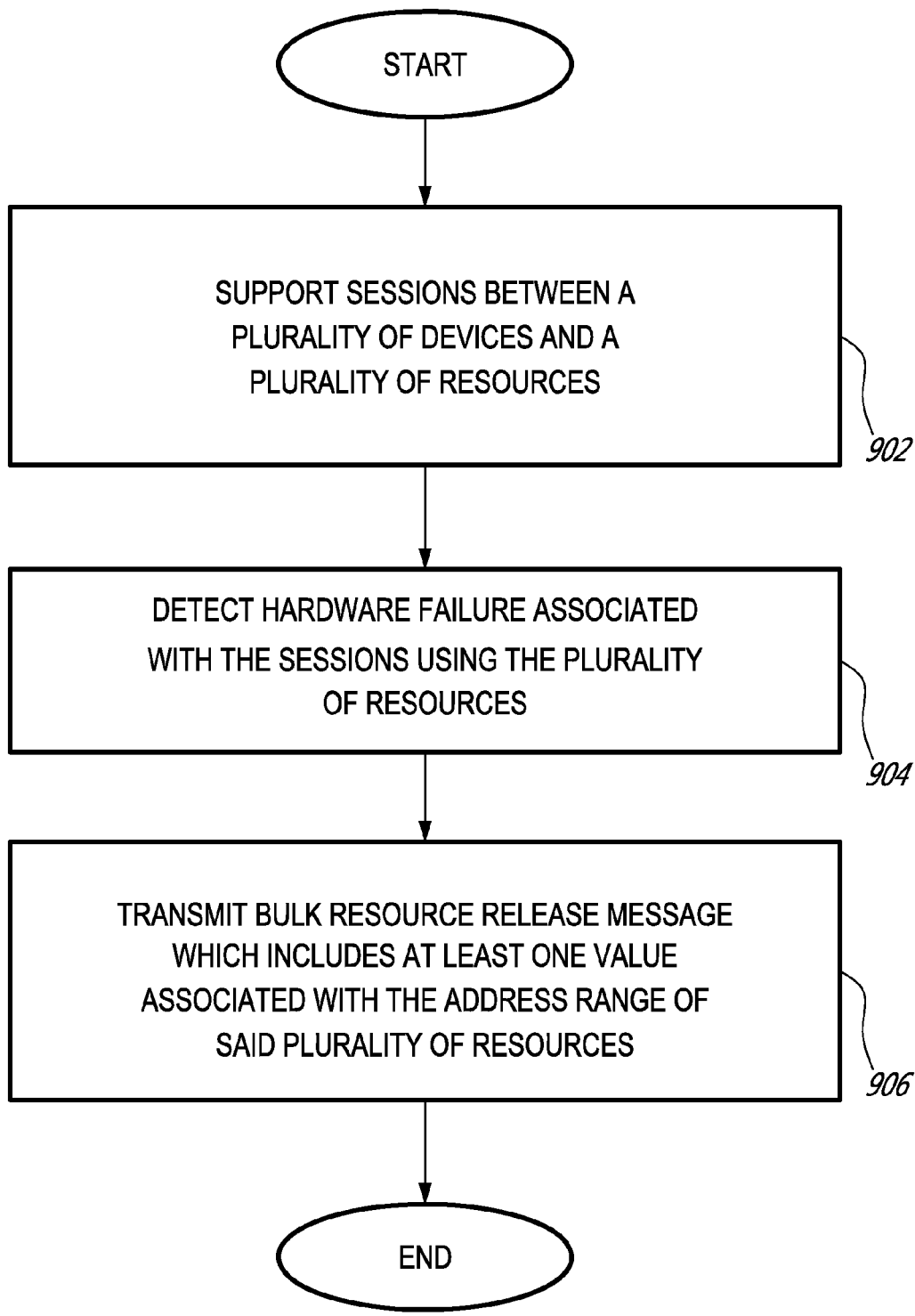

SYSTEMS AND METHODS FOR BULK RELEASE OF RESOURCES ASSOCIATED WITH NODE FAILURE

RELATED APPLICATION

This application is related to, and claims priority from, U.S. Provisional Patent Application Ser. No. 61/086,851, entitled "Bulk Release at Partial Node Failure", filed on Aug. 7, 2008, the disclosure of which is incorporated here by reference.

TECHNICAL FIELD

The present invention relates generally to telecommunications systems and, in particular, to methods and systems for performing resource release.

BACKGROUND

Radiocommunication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

One example of such an evolved network is based upon the Universal Mobile Telephone System (UMTS) which is an existing third generation (3G) radiocommunication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

Building upon these systems, 3GPP Release 8 standardizes more of the LTE/Evolved Packet Core (EPC) systems and subsystems to include 3GPP and non-3GPP system access. To support this, the core network allows for either Proxy Mobile IP (PMIP) or GPRS Tunneling Protocol (GTP) to be used as the mobility protocol between gateways, e.g., Packet Data Network Gateway (PGW), Serving Gateway (SGW) and non-3GPP access gateways. These ongoing efforts to improve communication systems allow for the interoperability of the various generations of systems, and is fueled by both the increase of devices which can use these systems as well as the increase in services offered over these systems.

Accordingly, methods and systems for improving the efficiency of use for these communication systems are desirable.

SUMMARY

Systems and methods according to exemplary embodiments address this need and others by providing systems and methods for improving the efficiency of mobile communication systems.

According to one exemplary embodiment a method for releasing a plurality of resources includes the steps of supporting sessions between a plurality of devices and the plurality of resources, determining that a hardware failure has occurred which is associated with the sessions using the plurality of resources, and transmitting a bulk resource release message which includes at least one value associated with an address range of the plurality of resources.

According to another exemplary embodiment, a communication node includes at least one component for supporting sessions between a plurality of devices and a plurality of resources, and a processor for determining that a hardware failure associated with the at least one component has occurred and for transmitting a bulk resource release message which includes at least one value associated with an address range of the plurality of resources.

BRIEF DESCRIPTION OF THE DRAWINGS

The accompanying drawings illustrate exemplary embodiments, wherein:

FIG. 9 illustrates a process flow for releasing resources according to exemplary embodiments.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As mentioned above, it is desirable to provide mechanisms and methods for improving efficiency in communication systems, e.g., mobile communication systems. More particularly, the following exemplary embodiments describe methods and systems for improving the efficiency of communication systems by reducing the message traffic associated with releasing resources upon the partial failure of, one or more nodes (or components of nodes) used in various communication systems. Additionally, when a partial node failure occurs, some part of the node is still "alive", e.g., the control plane and able to communicate the failure. In order to provide some context for this discussion, an exemplary communications architecture in which the exemplary embodiments may be used is shown in FIG. 1, although those skilled in the art will appreciate that the present invention is not limited to usage in such architectures.

Figure 1:
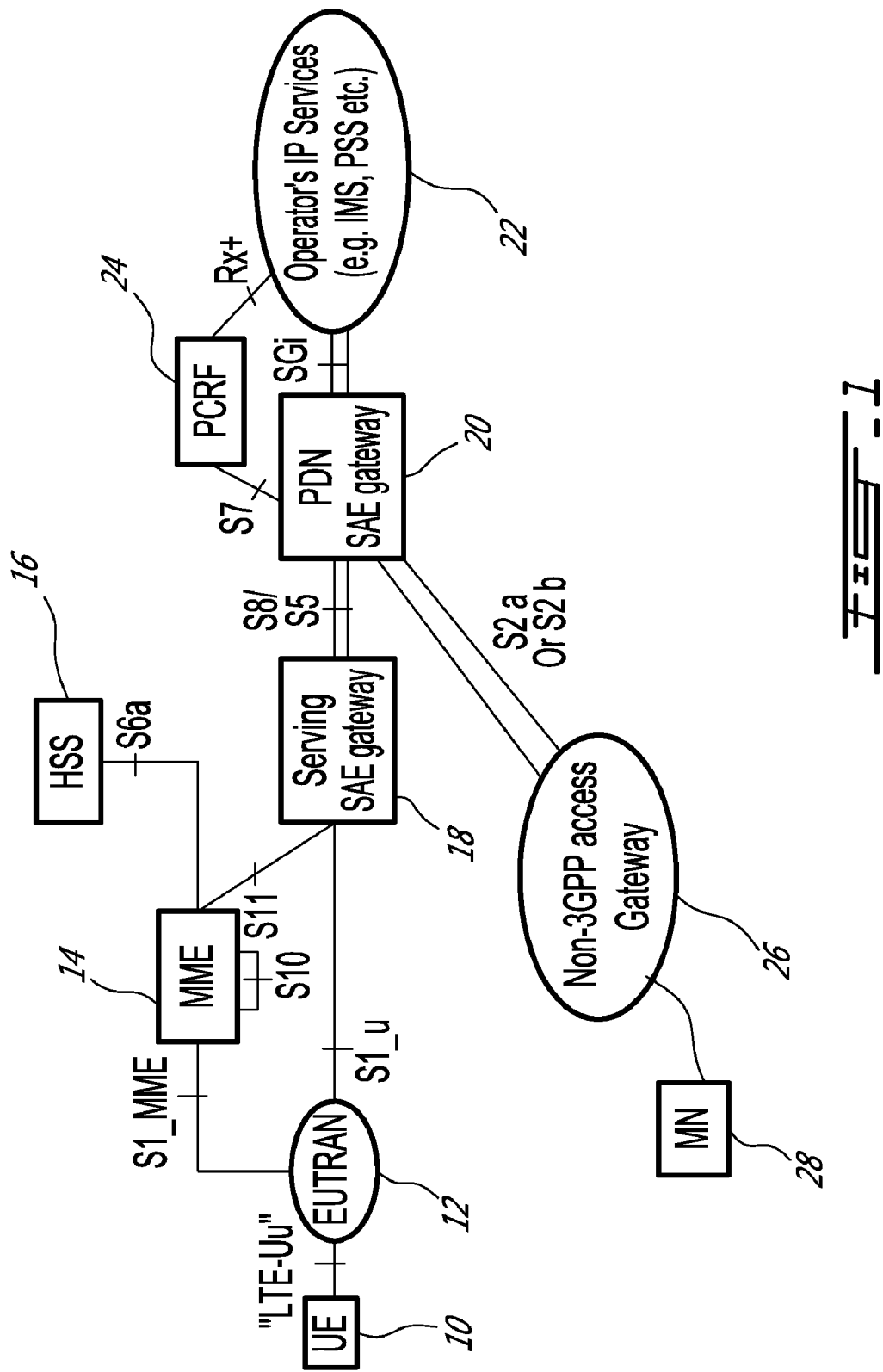
FIG. 1 depicts a long term evolution (LTE) radio access network (RAN) and a system architecture evolution (SAE) core network (CN) in communication with other devices in which exemplary embodiments can be implemented.

According to exemplary embodiments, a long term evolution (LTE) radio access network (RAN)/system architecture evolution (SAE) core network (CN) 100 which also allows access by equipment designed in accordance with other architectures, e.g., non-third generation partnership project (3GPP) architectures, is shown in FIG. 1. Initially, MS 10 is in radio communication with an eNodeB (not shown) which resides within an Evolved-Universal Terrestrial Radio Access Network (E-UTRAN) 12 (also known as an LTE RAN), and which contains various control functions for connection mobility control, scheduling and radio resource management. The E-UTRAN 12 communicates in the control plane via an S1-MME interface with a mobility management entity (MME) 14. MME 14 manages, for example, the distribution of paging messages to eNodeB(s) and is also involved in handoff signaling. Additionally, the MME 14 is in communication with a home subscriber server (HSS) 16, which is a database containing subscriber information and which handles authorization/authentication issues associated with the MS 10's communications in the network.

The E-UTRAN 12 also communicates in the user plane via an S1-UP interface with a Serving SAE Gateway (SGW) 18 which performs a variety of functions, such as packet routing and forwarding, mobility anchoring for inter-3GPP mobility as well as being the gateway which terminates the interface towards the E-UTRAN 12. The SGW 18 has a communications link with the MME 14 through the S11 interface and is also in communications with a Packet Data Network SAE Gateway (PDN SAE GW or PGW) 20 over the S5/S8 interfaces. The PGW 20 performs a variety of functions, such as IP address allocation for UE 10, and may also perform the 3GPP pre-release 8 version functions that were previously associated with a gateway general packet radio service (GPRS) support node (GGSN).

Additionally, the PGW 20 allows access to the operator's IP services 22 where, for example, IP Multimedia Subsystem (IMS) services to support telephony services can reside. In this exemplary architecture, the PGW 20 also communicates with a non-3GPP access gateway 26, over the S2a and S2b interfaces, for granting devices associated with other communication systems, e.g., a mobile node (MN) 28 associated with an older generation architecture, access to an operator's IP services 22. A Policy and Charging Rules Function (PCRF) 24 is in communications with both the PGW 20 and the operator's IP Services 22. The PCRF 24 handles, for example, functions including the allowance or refusal of certain types of traffic, e.g., based upon local regulations, and rules dealing with packet grouping. The various interfaces and other elements of this exemplary LTE/SAE network 100 are further described in their associated standards documents, for example, the 3GPP TS 23.401 Release 8, which is available online at www.3gpp.org.

As shown in FIG. 1, the interfaces for communication between the SGW 18 and the PGW 20 are referred to as the S5 and the S8 interfaces. The S5 interface provides, for example, user plane tunneling and tunnel management between these two gateways. The S8 interface performs generally the same functions as the S5 interface, but for inter-public land mobile networks (PLMNs) communications, e.g., when the SGW 18 is in a visiting PLMN and the PGW 20 is in the home PLMN. Various protocols can be used for information exchange between the SGW 18 and the PGW 20 over the S5/S8 interfaces such as Proxy Mobile IP (PMIP) and GPRS Tunneling Protocol (GTP). The choice of the protocol to be used in communicating over these interfaces is dependent upon, for example, the protocol used by the network via which the mobile device is connected to these nodes. Additionally, as shown in FIG. 1, when the PDN SAE gateway 20 is handling communications associated with the creation of a session for a mobile device connected to the system 100 through a non-3GPP access gateway 26, i.e., over the S2a or S2b interfaces, the PMIP protocol will be used.

Figure 2:
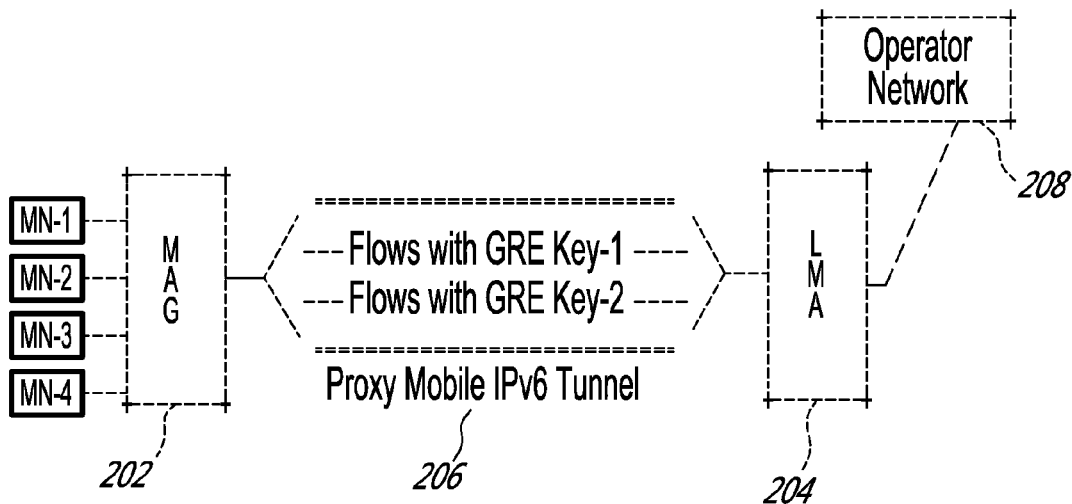
FIG. 2 depicts communications between a mobile access gateway (MAG) and a local mobility anchor (LMA)
Figure 3:
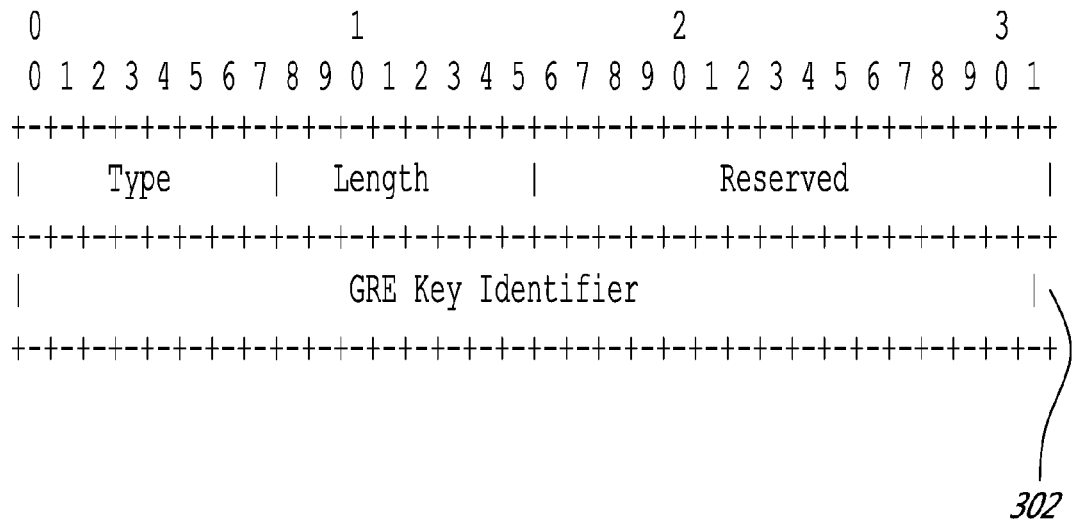
FIG. 3 shows the format for a generic routing encapsulation (GRE) key.

Gateways can be used for, among other things, forwarding resource requests to the proper resource controlling node(s) during the process of session setup for a mobile device with a resource or resources, e.g., resources associated with services providing text messaging, weather information, traffic information and the like, associated with an operator network, and releasing resources upon session tear-down. For example, a PGW 20 can send requests to its peer node, SAE gateway 18, associated with obtaining resources for session setup in the exemplary architecture of FIG. 1. Such requests can, for example, involve the usage of resource identifiers as shown in FIG. 2. Therein, mobile nodes (MN-1 through MN-4) are in communication with a mobile access gateway (MAG) 202. Using the PMIP protocol, the MAG 202 communicates with a local mobility anchor (LMA) 204 via a Proxy Mobile IPv6 Tunnel 206. As needed, the requests from the mobile nodes are forwarded from the LMA 204 to various resources in the operator network 208, which can be an IP network. For each resource requested by a mobile node, a generic routing encapsulation (GRE) key is assigned. This GRE key 302, which is an identifier associated with the requested resource, can be provided in the format shown in FIG. 3, which format is described in, for example, the document entitled "GRE Key Option for Proxy Mobile IPv6 draft-ietf-netlmm-grekey-option-01.txt", found at www.tools.ietf.org. Uplink and downlink GRE keys can be created by the MAG 202 and LMA 204, respectively, and transmitted between the two gateways in a Proxy Binding Update message and a Proxy Binding Acknowledgement message. Additionally, these GRE keys can be used by nodes and peer nodes for marking each mobile node's data flow, e.g., sessions and their associated resources.

Figure 4:
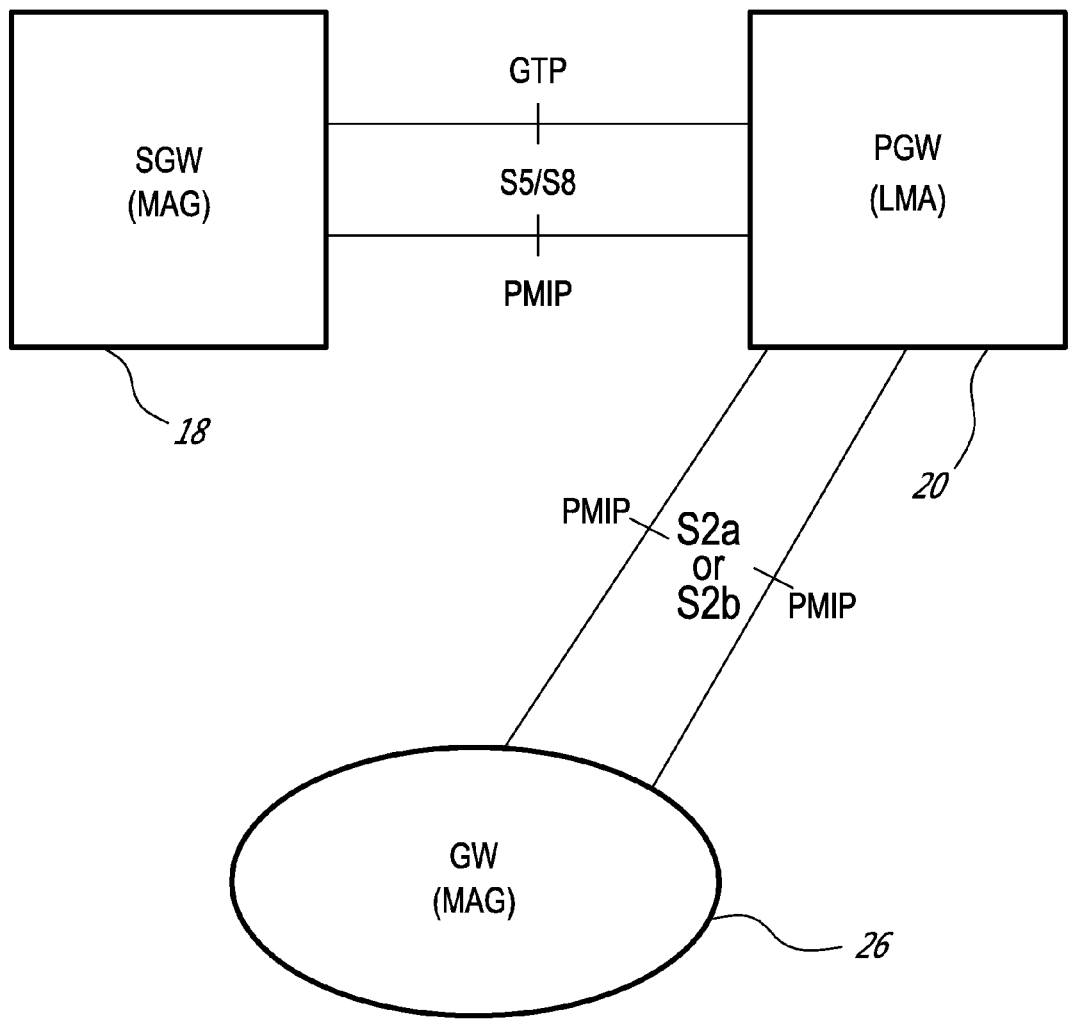
FIG. 4 illustrates gateway combinations according to exemplary embodiments.

The gateway configuration shown in FIG. 2, can be combined with the architecture shown in FIG. 1 to create the gateway and interface configuration shown in FIG. 4. Like FIG. 1, FIG. 4 includes an SGW 18, PGW 20 and a non-3GPP access GW 26. However, these gateways have additional functions. For example, the SGW 18 and the non-3GPP access GW 26 also include the functionality of a MAG 202, and the PGW 20 includes the functionality of an LMA 204. This allows these gateways to assign GRE keys, as described above, to mobile devices, e.g., MNs 28 and/or UEs 10, which in turn permits the tracking and correlation of resources to each mobile device. Therefore, any of the SGW 18, PGW 20, and non-3GPP access GW 26 acting as a MAG 202 or an LMA 204, can release the session by sending a Binding Revocation Indicator (BRI) message, if the PMIP protocol was used for session setup, or by sending a Delete Bearer Request message, if the GTP protocol was used for the session setup. This conventional release mechanism is operative for a single mobile device and a single resource. While this conventional release mechanism may be adequate for the release of a single session, e.g., when a user terminates his or her service session, it is inefficient for other situations. For example, if a circuit board associated with a node, e.g., PGW 20, fails, then it might be necessary to release thousands of resources simultaneously. Under such circumstances, releasing resources using a single message per resource would be inefficient.

Figure 5:
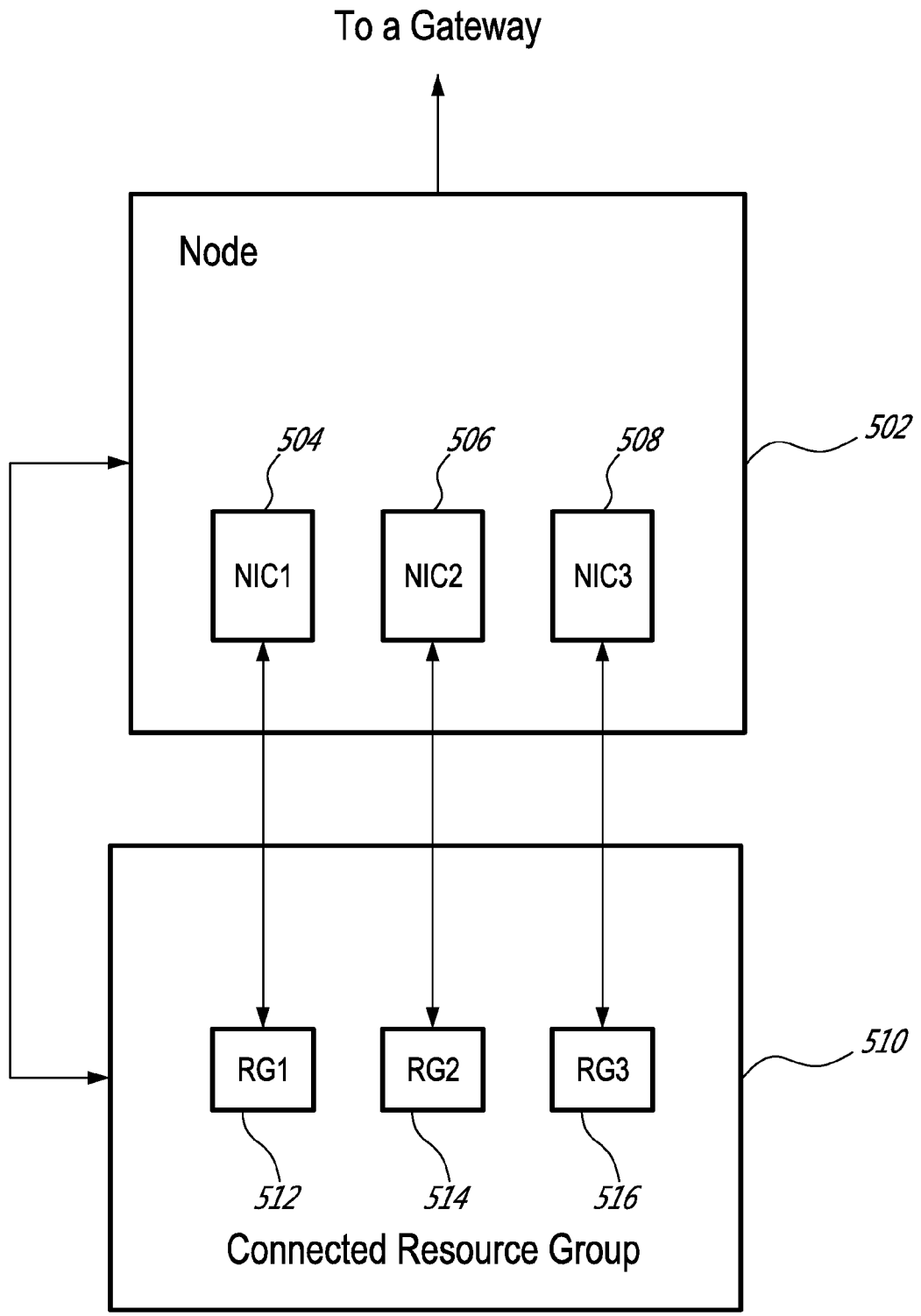
FIG. 5 shows a node in communication with a connected resource group according to exemplary embodiments.

Accordingly, exemplary embodiments provide for techniques which enable bulk release of resources in such systems. Consider that, at any given time, multiple UEs 10 are typically in communications with an operator network and are requesting services which use resources, e.g., chat sessions using instant messaging. The routing and assignment of these requests can be made through a single node, through multiple nodes, through peer nodes and/or any combination thereof. To simplify and generalize the discussion, a purely illustrative example is used below wherein resource requests pass through a single node, which has a plurality of subcomponents, and which is in communication with a connected resource group as shown in FIG. 5.

According to exemplary embodiments, a node 502 is in communications with a connected resource group 510 and either directly or indirectly to a gateway, e.g., an SGW 18, a PGW 20 or a non-3GPP access gateway 26. Alternatively, node 502 may be one of the gateways 18, 20 or 26. For example, node 502 may represent PGW 20. In this example, node 502 includes three subcomponents, NIC1 504, NIC2 506 and NIC3 508, which may be implemented as different circuit boards. Each network interface card (NIC) routes requests from a plurality of mobile devices to a resource group (RG), e.g., RG1 512, RG2 514 and RG3 516 located in connected resource group 510, and each plurality or grouping of devices is associated with a range of addresses associated described by, for example, GRE keys in PMIP or Tunnel Endpoint Identifier (TEID) values in GTP. The resource groups may, for example, be managed by a peer node 510, e.g., SGW 18, associated with the node 502, e.g., PGW 20. These addresses (GRE keys or TEID values) can be used to identify a session and the resource being used by a mobile device. This allows node 502 to know the addresses of resources which are currently allocated to ongoing sessions with mobile devices. Also, while NICs have been shown as exemplary elements or subcomponents within node 502 that could be points of failure within a node, it will be appreciated that other hardware elements can be present in node 502 which could also fail and result in the bulk release of resources according to these exemplary embodiments.

As mentioned above, currently when releasing these resources at the end of a session or due to some type of failure, the resources are released at a rate of one session and its related resource per release message by, e.g., sending a Binding Revocation Indicator message and/or a Delete Bearer Request message. However, when, for example, one or more of the NICs 504, 506 or 508 fail, this partial node failure impacts a subset of all of the sessions which a node 502 coordinates. In such a partial node failure, if the gateway associated with the node (or the gateway itself) is not fully redundant, then that gateway needs to send potentially thousands of the release messages, e.g., one per session, in order to clean up the allocated resources, e.g., in the peer node. This manner of releasing one resource per message will create a lot of network signaling traffic. Additionally, for a complete node failure bulk release of resources can be performed but such methods used for a complete failure are not fully compatible for use with a partial node failure. For example, for a complete node failure an additional identification method can be used which requires both peer systems to keep all identification information in their respective memories as well as understanding the node internal structure by the peer system (this allows the peer system to understand which session belongs to which group).

According to exemplary embodiments, methods and systems for the bulk release of resources for a partial node failure will be described below. In an evolved packet system (EPS) network, the GRE key is required for each PMIP session and the TEID is required for each GTP session. The GRE key or TEID can, for example, be assigned to each NIC (board or other relevant subcomponent) on a group basis. This assignment process allows for a bulk resource releasing solution using a plurality of GRE keys or TEID, e.g., a range of GRE keys or TEID. For example, as a node 502 assigns/supports sessions/resources, e.g., a part of a binding cache, through its subcomponents, the node 502 knows the values of the assigned GRE keys, i.e., the node 502 may store, in each subcomponent, the highest and lowest GRE key (or TEID value) according to one exemplary embodiment. Therefore, when a subcomponent fails, the node 502 knows the identities of the resources that need to be released based on the known, correlated understanding of the GRE keys associated with their respective resources which have been grouped together into a continuous range of GRE keys or TEID values for that subcomponent. Additionally, node 502's control component, e.g., a processor linked to memory, typically has the capability to know or determine when its respective payload subcomponents are either operational or have failed. The control component shall also have the knowledge of the address range used by each payload components.

Figures 6, 7:
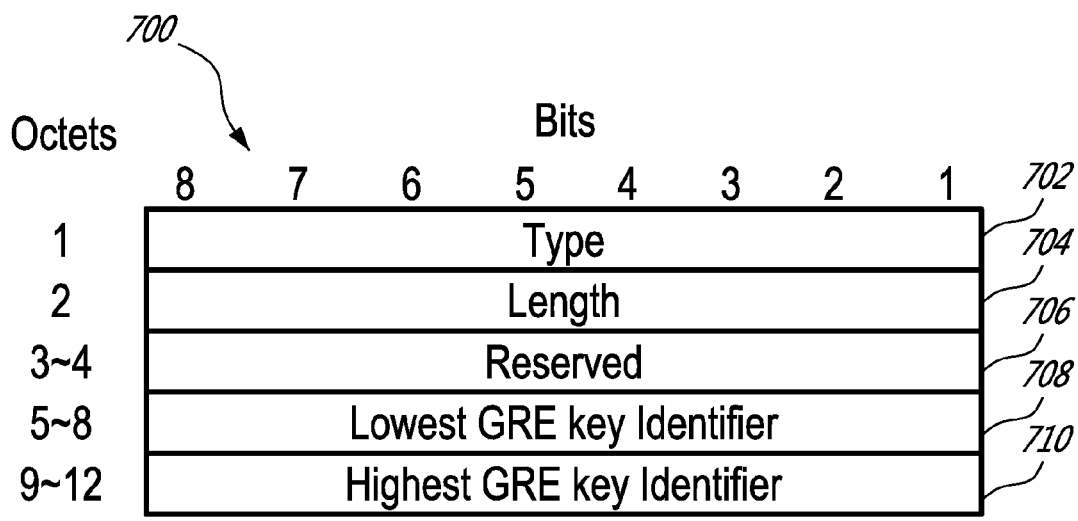
FIG. 6 shows a Binding Revocation Indicator (BRI) message.
FIG. 7 illustrates a new mobility option according to exemplary embodiments.

According to exemplary embodiments, the address range (GRE key or TEID values) which are associated with a partial node failure can be transmitted in a single bulk resource releasing message to the peer node. Upon receiving the BRI message, the peer node can release the resources associated with the address range. For example, when using PMIP, a node 502 can transmit a Binding Revocation Indication message which includes the range of the GRE keys which were being used to support sessions in a failed subcomponent, e.g., a failed board or NIC. An example of a Binding Revocation Indication message 602 according to this exemplary embodiment is shown in FIG. 6. Upon receiving this Binding Revocation Indication (BRI) message 602, a peer node (or similar logical entity which includes the resources) can look up the received GRE key range and release all sessions and associated resources within the indicated GRE key range.

To support this feature, a new mobility option can be used in the BRI message 602 which includes, for example, a range of GRE keys. A purely illustrative example of this new mobility option 700 is shown in FIG. 7, although it will be appreciated that other formats can be used. Breaking down the description of this exemplary mobility option by octets, octet 1 includes the type 702 to be defined by the internet assigned number association, octet 2 describes the length 704, e.g., an eight bit unsigned integer indicating the length in octets of the option, excluding the type and length field, having a value, e.g. 10. Octets 304 are reserved 706 for future use, however at this time to support current standards, the value can be initialized to 0 by the sender and can be ignored by the receiver. In this example, octets 5-8 describe the lowest GRE key identifier 708 in a four byte field containing the lowest GRE key identifier in the range and octets 9-12 describe the highest GRE key identifier in a four byte field containing the highest GRE key identifier 710 in the range.

According to another exemplary embodiment, the new mobility option described above can be used in other protocols for allowing a bulk release of resources upon a partial node failure. For example, the new mobility option 700 shown in FIG. 7 can be used in the Delete Bearer Request message as used in GTP. The new mobility option 700 can be inserted into a field in the Delete Bearer Request message in a manner similar to that described above for the BRI message.

According to an exemplary embodiment, bulk release of resources for a partial node failure can be performed in a non-GPRS system which uses PMIP. A BRI message can be used for the bulk release of resources, but instead of using a range of GRE keys in the new mobility option 700 as shown in FIG. 7, alternative addressing methods can be used. For example, instead of using a range of values, a single value that is representative of a range of values could be used and inserted into the new mobility option to replace the high and low GRE key values.

Figure 8:
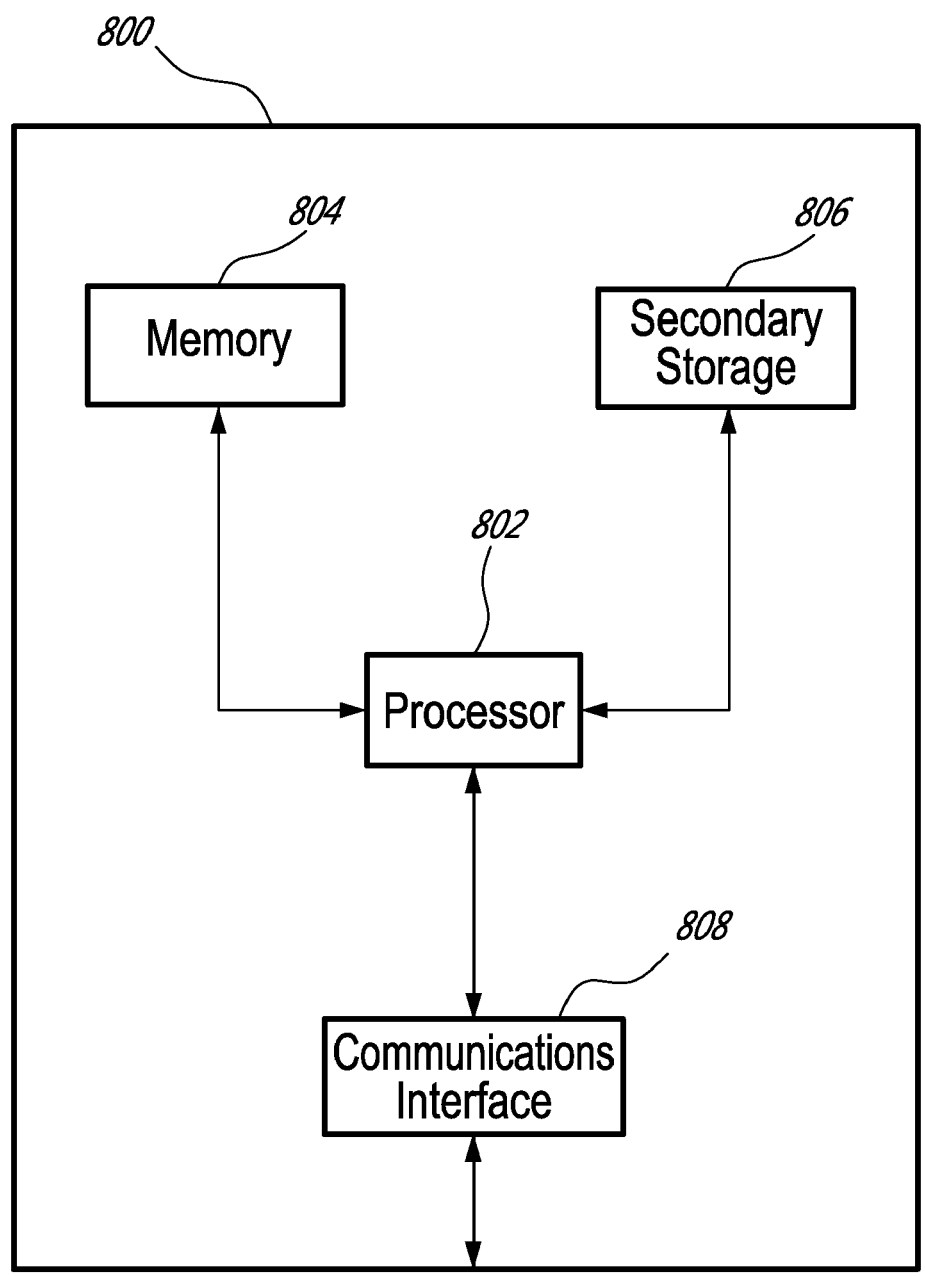
FIG. 8 shows a communications node according to exemplary embodiments.

The exemplary embodiments described above provide for, among other features, systems and methods for a bulk release of resources. An exemplary communications node 800 will now be described with respect to FIG. 8. Communications node 800 can contain a processor 802 (or multiple processor cores), a memory 804, one or more secondary storage devices 806 and a communications interface unit 808 (which can include a plurality of subcomponents, e.g., NICs) to facilitate communications between communications node 800 and other networks and devices. When communications node 800 performs the function of routing session information, including resource requests, to resources, the communications node 800 is capable of storing the associated GRE keys and/or GRE key ranges used by its subcomponents which are associated with each session, e.g., in its memory 804. This information then allows communications node 800 to transmit a bulk resource release message when a (partial) node failure occurs.

Utilizing the above-described exemplary systems according to exemplary embodiments, a method for communicating information associated with the release of resources is shown in the flowchart of FIG. 9. Therein, at step 900, sessions between a plurality of devices and a plurality of resources are supported. At step 902, a hardware failure is detected which is associated with the sessions using the plurality of resources. A bulk resource release message, which includes at least one value associated with the address range of said plurality of resources, is then transmitted at step 904.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for releasing a plurality of resources comprising:
   supporting sessions between a plurality of devices and said plurality of resources;
   determining that a hardware failure has occurred which is associated with the sessions using said plurality of resources; and
   transmitting a bulk resource release message which includes at least one value associated with an address range of said plurality of resources;
   wherein said at least one value identifies a plurality of generic router encapsulation (GRE) keys.

2. The method of claim 1, wherein said at least one value is a range of values, wherein each value within said range of values corresponds to a resource to be released.

3. The method of claim 1, wherein said step of determining that said hardware failure has occurred which is associated with said plurality of resources further comprises:
   determining that a subcomponent of a communications node has failed.

4. The method of claim 2, wherein said range is a continuous range of GRE keys.

5. The method of claim 1, wherein said devices include at least one of user equipment and mobile nodes.

6. The method of claim 1, wherein said plurality of resources include resources associated with at least one of text messaging, weather information and traffic information.

7. The method of claim 1, further comprising the step of:
   assigning said plurality of GRE keys by a gateway node.

8. The method of claim 7, wherein said gateway node is one of a serving gateway, a packet data network gateway and a non-third generation partnership project access gateway.

9. The method of claim 1, wherein said hardware failure is a partial node failure.

10. A communication node comprising:
    at least one component for supporting sessions between a plurality of devices and a plurality of resources; and
    a processor for determining that a hardware failure associated with said at least one component has occurred and for transmitting a bulk resource release message which includes at least one value associated with an address range of said plurality of resources;
    wherein said at least one value identifies a plurality of generic router encapsulation (GRE) keys.

11. The communication node of claim 10, wherein said at least one component is a network interface card (NIC).

12. The communication node of claim 10, wherein said at least one value is a range of values, wherein each value within said range of values corresponds to a resource to be released.

13. The communication node of claim 12, wherein said range is a continuous range of GRE keys.

14. The communication node of claim 10, wherein said plurality of devices include at least one of user equipment and mobile nodes.

15. The communication node of claim 10, wherein said plurality of resources include resources associated with at least one of text messaging, weather information and traffic information.

16. The communication node of claim 10, wherein said processor also assigns said plurality of GRE keys.

17. The communication node of claim 10, wherein said communication node is one of a serving gateway, a packet data network gateway and a non-third generation partnership project access gateway.

18. The communications node of claim 10, wherein said hardware failure associated with said at least one component is a partial node failure.

* * * * *